United States Patent
Wehrend et al.

(10) Patent No.: US 7,342,921 B1
(45) Date of Patent: Mar. 11, 2008

(54) METHOD FOR CONNECTING EXCHANGES VIA A PACKET-ORIENTED COMMUNICATION NETWORK

(75) Inventors: Klaus Wehrend, Eichenau (DE); Wolfgang Fraas, Wolfratshausen (DE); Klaus Hünlich, Neuching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,594

(22) PCT Filed: Sep. 23, 1999

(86) PCT No.: PCT/DE99/03055

§ 371 (c)(1),
(2), (4) Date: Mar. 30, 2001

(87) PCT Pub. No.: WO00/19764

PCT Pub. Date: Apr. 6, 2001

(30) Foreign Application Priority Data

Sep. 30, 1998 (DE) ................................ 198 45 031

(51) Int. Cl.
*H04L 12/66* (2006.01)
*H04L 12/28* (2006.01)
*H04L 12/56* (2006.01)
*H04J 3/18* (2006.01)

(52) U.S. Cl. ............... 370/356; 370/354; 370/401; 370/477

(58) Field of Classification Search ............... 370/401, 370/352, 356, 395.1, 395.6, 395.64, 466
See application file for complete search history.

(56) References Cited

U.S. PATENT DOCUMENTS

| | | | |
|---|---|---|---|
| 5,764,645 A * | 6/1998 | Bernet et al. ........... | 370/395.52 |
| 6,041,054 A * | 3/2000 | Westberg ................ | 370/389 |
| 6,229,821 B1 * | 5/2001 | Bharucha et al. ........ | 370/471 |
| 6,269,095 B1 * | 7/2001 | Neubauer et al. ........ | 370/352 |
| 6,330,239 B1 * | 12/2001 | Suzuki .................. | 370/395.1 |
| 6,404,765 B1 * | 6/2002 | Bernstein et al. ........ | 370/389 |
| 6,466,578 B1 * | 10/2002 | Mauger et al. .......... | 370/395.3 |
| 6,804,246 B1 * | 10/2004 | Petersen et al. ........ | 370/395.64 |

FOREIGN PATENT DOCUMENTS

| | | |
|---|---|---|
| EP | 0 796 020 A2 | 9/1997 |
| EP | 0 827 305 A1 | 3/1998 |
| GB | 2 320 396 A | 6/1998 |

* cited by examiner

*Primary Examiner*—Ronald Abelson
(74) *Attorney, Agent, or Firm*—Bell, Boyd & Lloyd LLP

(57) ABSTRACT

A method for connecting exchanges via a packet-oriented communication network wherein the exchanges are connected via a respective conversion device to the packet-oriented communication network, in which data transmission involves data packets subdivided into substructure elements being set up. For data transmission, the conversion device associated with a transmitting exchange inserts the substructure elements into the data packets, and a conversion device associated with the receiving exchange separates the substructure elements from the data packets.

5 Claims, 3 Drawing Sheets

METHOD FOR CONNECTING EXCHANGES VIA A PACKET-ORIENTED COMMUNICATION NETWORK

BACKGROUND OF THE INVENTION

1. Field of the Invention

The present invention relates to a method for connecting exchanges via a packet-oriented communication network which permits voice data to be transmitted via a packet-oriented communication network without any loss of the voice quality.

2. Description of the Prior Art

Increasing global orientation of companies means that the use of telecommunication services for transmitting voice and data is constantly increasing. The result of this is that the costs caused by these telecommunication services are constantly rising and become a considerable cost factor for the companies, which therefore seek opportunities to reduce these costs. One opportunity for being able to transmit data inexpensively and on a worldwide basis is afforded by global computer networks, such as the Internet.

The U.S. patent application with the official file reference Ser. No. 08/942,592 has already proposed a method and an arrangement which enable data which is to be transmitted within the context of a voice link to be transmitted via a packet-oriented communication network, such as the Internet. To this end, the exchanges involved in a voice link are connected to the Internet via a respective Internet access unit, frequently called Telephony Internet Server TIS in the literature. In this case, the data which is to be transmitted within the context of a voice link is transmitted on the basis of the RTP protocol (Realtime Transport Protocol) in accordance with ITU-T Standard H.225.0 (International Telecommunication Union).

If compressed voice data, as used for mobile radio, for example, is transmitted, then this compressed voice data need to be decompressed in the Internet access unit, converted into the packet-oriented data format based on the RTP protocol and then compressed again for transmission at the transmitter end before transmission. Furthermore, at the receiver end, the data needs to be decompressed, converted into the original data format and then compressed again for further transmission. This frequent compression/decompression of the voice data results in corruption of the originally transmitted voice data at the receiver end, wherein the corruption sometimes is audible and, hence, perceivable as interference.

In addition, laid-open specification GB-A-2 320 396 discloses a method for transmitting voice data via a packet-oriented communication network in which data produced in the form of IP data packets are converted into AAL-2 data packets at the transmitter end for data transmission via the packet-oriented communication network. However, converting the IP data packets into AAL-2 data packets likewise suffers impairment of the voice quality.

It is an object of the present invention, therefore, to specify a method which permits voice data to be transmitted via a packet-oriented communication network without any loss of the voice quality.

SUMMARY OF THE INVENTION

Accordingly, the present invention is directed to a method for connecting exchanges via a packet-oriented communication network, wherein data transmission involves data packets subdivided into substructure elements, and the connecting exchanges are connected to the packet-oriented communication network via respective conversion device, the method including the steps of: transmitting, via a transmitting one of the connecting exchanges, data to be transmitted as substructure elements to an associated transmitting conversion device; inserting, via the transmitting conversion device, the substructure elements into data packets unchanged; extracting, via a receiving conversion device associated with a receiving one of the connecting exchanges, the substructure elements from the received data packets; and forwarding the extracted substructure elements to the receiving one of the connecting exchanges unchanged.

A fundamental advantage of the method according to the present invention is that, by subdividing the data packets set up for data transmission via the packet-oriented communication network into so-called substructure elements, data assigned to different destinations can be transmitted within one data packet.

Another advantage of the present invention dependant claims is, amongst other things, and substitute therefor, pursuant to an alternative embodiment, is that the transmission of an individually settable number of useful data bytes, assigned to a voice link, in a substructure element of a data packet enables data to be transmitted at a variable transmission rate. This permits the use of compression algorithms which produce a variable data stream from a continuous data stream on the basis of the redundancy which exists in the data to be transmitted without corrupting the information.

Another advantage of the present invention, pursuant to yet another embodiment, is that defining the first useful data segment of a data packet as a pointer which denotes the start address of a first substructure element situated in the useful data area of the data packet provides a simple way of synchronizing the exchanges when one or more data packets are lost.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
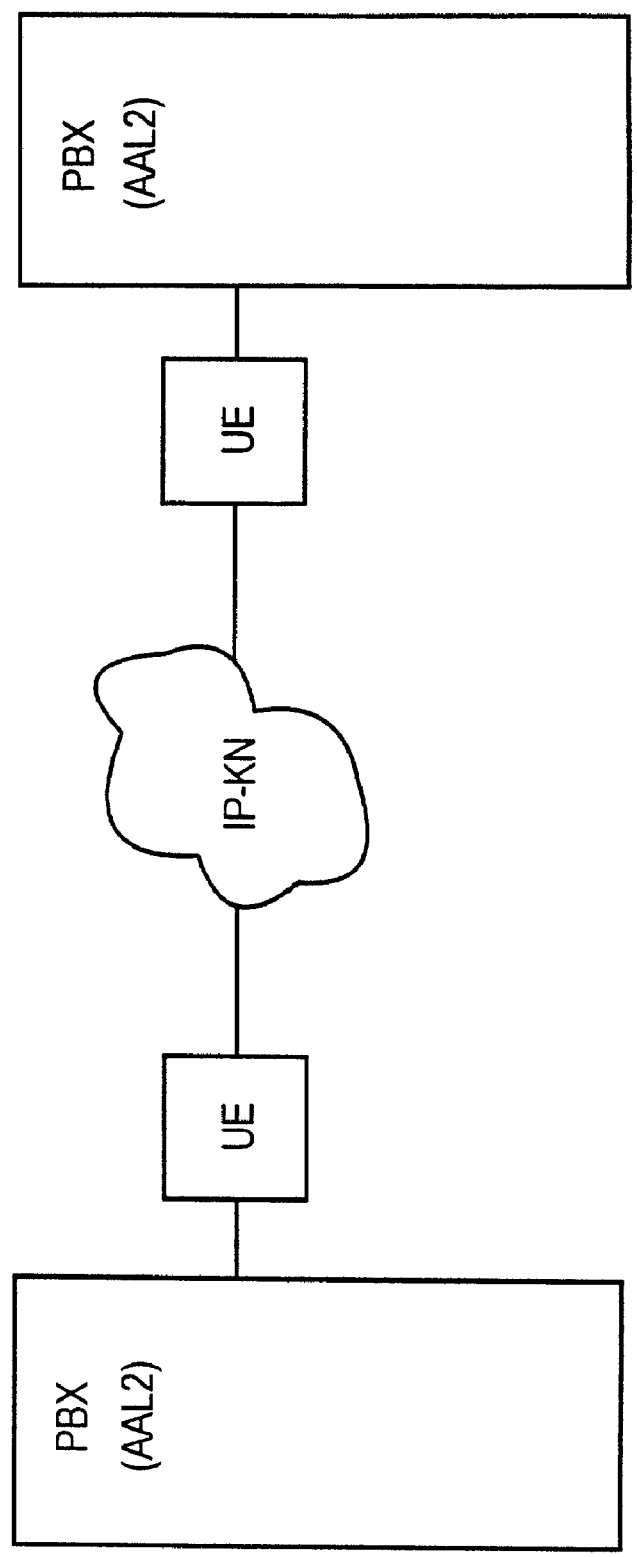
FIG. 1 shows a structogram for schematically illustrating two exchanges connected via a packet-oriented communication network.

FIG. 1 is a schematic illustration showing two exchanges PBX connected to an IP-oriented (Internet Protocol) communication network IP-KN via a respective conversion unit UE. Examples of data networks in which IP protocols are preferably used are the so-called Ethernet based on IEEE Standard 802.3, or the so-called Token Ring based on IEEE Standard 802.5 (Institute of Electrical and Electronics Engineers). The conversion units UE are used, firstly, for connecting the exchanges PBX to the IP-oriented communication network IP-KN, and secondly, for bidirectional conversion between the exchange-internal data format and the data format of the IP-oriented communication network IP-KN.

In this case, exchange-internal data transmission and switching take place on the basis of substructure elements SE having the ATM data format (Asynchronous Transfer Mode) in accordance with the so-called ATM adaptation layer AAL Type 2 (ATM Adaptation Layer). In this context, the ATM adaptation layer AAL is used for adapting the ATM data format to the network layer (Layer 3) of the OSI reference model (Open System Interconnection).

Bidirectional conversion between the data format divided into substructure elements SE and the IP-oriented data format is performed by the conversion units UE on the basis of two different conversion modes, which are explained in more detail below.

Figure 2:
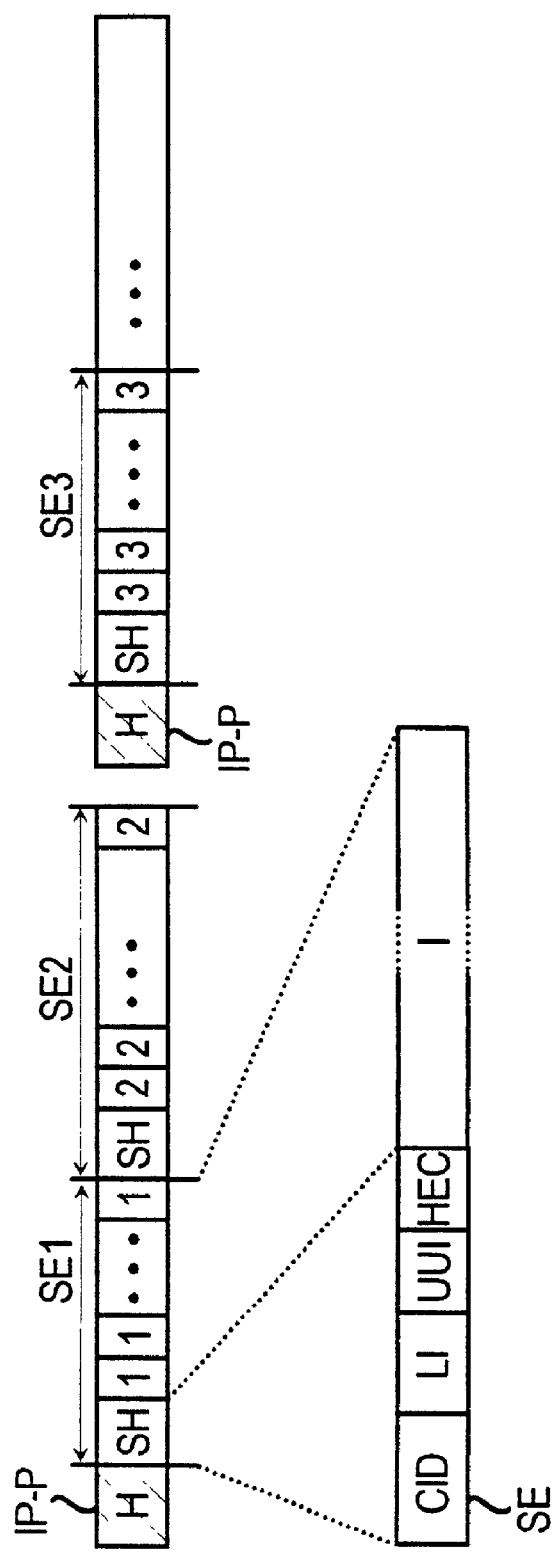
FIG. 2 shows a structogram for schematically illustrating IP data packets subdivided into substructure elements, on the basis of a first conversion mode.

FIG. 2 shows a schematic illustration of IP data packets IP-P subdivided into substructure elements SE, on the basis of a first conversion mode. An IP data packet IP-P is made up of a packet header H and a useful data field having a variable length of 1-65 536 bytes. The packet header H essentially stores switching data, such as the destination address and the origin address of an IP data packet IP-P.

A substructure element SE is made up of a cell header SH with a length of 3 bytes and a useful data area I of variable length (0 to 64 bytes). The cell header of a substructure element SE is in turn subdivided into a channel identifier CID (Channel Identifier) with a length of 8 bits, a length identifier LI (Length Indicator) with a length of 6 bits, a transmitter/receiver identifier UUI (User-to-User Indication) with a length of 5 bits and a cell header checksum HEC (Header Error Control) with a length of 5 bits. The channel identifier CID provides the option to assign a substructure element SE to a particular connection via the IP-oriented communication network IP-KN, and hence to transmit data assigned to different connections in one IP data packet.

On the basis of the first conversion mode, the substructure elements SE are inserted into the useful data field of an IP data packet IP-P such that the first byte of the useful data field is occupied by a cell header SH of a substructure element SE, and the last byte of the useful data field concludes with the last byte of a substructure element SE. As such, the length of the useful data field of an IP data packet IP-P is chosen such that one or more substructure elements SE are transmitted completely in one IP data packet IP-P. By way of example, in FIG. 2, two substructure elements SE1, SE2 are transmitted completely in a first IP data packet IP-P, and one substructure element SE3 is transmitted in a second IP data packet IP-P.

In case one or more IP data packets IP-P have gone missing, e.g. as a result of a transmission error, the length identifier LI of the first substructure element SE transmitted in the useful data field of an IP data packet IP-P can be used for synchronization between the transmitter and the receiver, since this length identifier LI can determine the position of other substructure elements SE which may be arranged in the useful data field.

Figure 3:
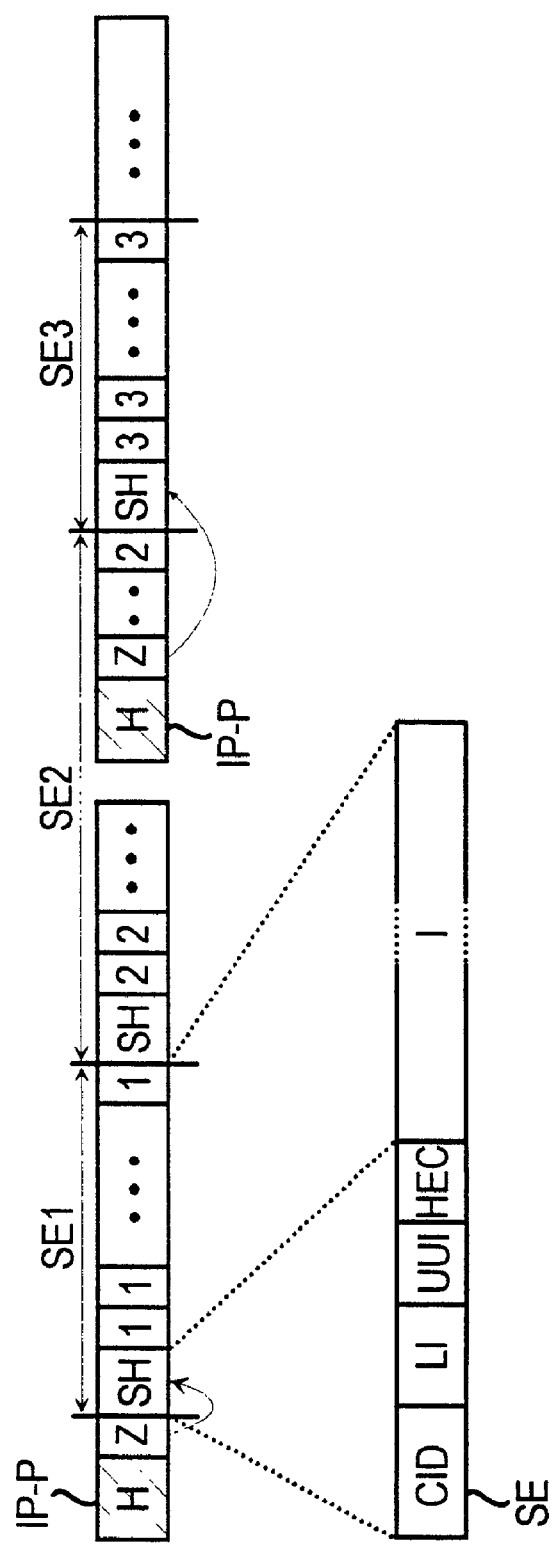
FIG. 3 shows a structogram for schematically illustrating IP data packets subdivided into substructure elements, on the basis of a second conversion mode.

FIG. 3 shows a schematic illustration of IP data packets IP-P subdivided into substructure elements SE, on the basis of a second conversion mode. On the basis of the second conversion mode, substructure elements SE also can be split over useful data fields of a number of IP data packets IP-P. FIG. 2 shows this by way of example for the substructure element SE2. The result of this is that it is no longer imperative for the useful data field of an IP data packet IP-P to start with a cell header SH of a substructure element SE. As such, if one or more IP data packets have been lost, synchronization of transmitter and receiver by the length identifier LI of a substructure element SE is no longer possible.

For this, the first byte of the useful data field of an IP data packet IP-P is defined as a pointer Z. Thus, the substructure elements SE are transmitted only upon the second byte of the useful data field of an IP data packet IP-P. This pointer Z indicates the start address of the first substructure element SE whose cell header SH is in the useful data field of an IP data packet IP-P. Thus, this pointer Z can be used to restore the synchronization between transmitter and receiver.

Within the context of data transmission from a transmitting exchange PBX to a receiving exchange PBX, the data to be transmitted is transmitted to the conversion unit UE associated with the exchange PBX by the transmitting exchange PBX in the form of substructure elements SE. In the conversion unit UE, the substructure elements SE are inserted into data packets IP-P on the basis of the first or second conversion mode, the packet header H of the data packets IP-P containing the IP address of the conversion unit UE associated with the receiving exchange PBX. The data packets IP-P are then transmitted via the IP-oriented communication network IP-KN to the conversion unit UE associated with the receiving exchange PBX. This conversion unit UE extracts the substructure elements SE contained in the received data packets IP-P and forwards the extracted substructure elements SE to the receiving exchange PBX.

Transmission of data combined into substructure elements SE on the basis of the ATM adaptation layer AAL Type 2 via the IP-oriented communication network IP-KN dispenses with bidirectional conversion between the data format divided into substructure elements SE and the RTP data format usually used for transmitting voice data via the IP-oriented communication network IP-KN. In addition, the associated compression/decompression of the data by the exchanges PBX, or by the Internet access units connected to the exchanges PBX, is also dispensed with. Hence, transmitting voice data from transmitter to receiver via an IP-oriented communication network IP-KN on the basis of substructure elements SE is possible without loss of the voice quality as a result of repeated compression and decompression of the voice data which is to be transmitted, since the voice data is transmitted via the IP-oriented communication network IP-KN transparently, i.e. without processing, in the substructure elements SE.

Although the present invention has been described with reference to specific embodiments, those of skill in the art will recognize that changes may be made thereto without departing from the spirit and scope of the invention as set forth in the hereafter appended claims.

We claim:

1. A method for connecting exchanges via a packet-oriented communication network, wherein switching of exchange-internal voice data takes place on the basis of substructure elements, and data transmission via the packet-oriented communication network involves Internet Protocol data packets, and the connecting exchanges are connected to the packet-oriented communication network via a respective conversion device, the method comprising the steps of:

subdividing the Internet Protocol data packets into substructure elements;

providing that each of the substructure elements include both a cell header and a useful data area;

transmitting, via a transmitting one of the connecting exchanges, voice data to be transmitted as substructure elements to an associated transmitting conversion device;

inserting, via the transmitting conversion device, the voice data substructure elements into the subdivided Internet Protocol data packets unchanged, wherein no compression or decompression of the voice data is performed;

transmitting the subdivided Internet Protocol data packets from the transmitting conversion device to a receiving conversion device;

extracting, via a receiving conversion device associated with a receiving one of the connecting exchanges, the voice data substructure elements from the received subdivided Internet Protocol data packets, wherein no compression or decompression of the voice data is performed; and forwarding, via the receiving conversion device, the extracted voice data substructure elements to the receiving one of the connecting exchanges unchanged.

2. A method for connecting exchanges via a packet-oriented communication network as claimed in claim 1, the method further comprising the steps of:

storing, via a respective cell header of a substructure element, a channel identifier for denoting assignment of the substructure elements to a transmission destination; and storing, via the respective cell header, an item of length information for indicating a number of useful data segments transmitted in the substructure element.

3. A method for connecting exchanges via a packet-oriented communication network as claimed in claim 1, wherein the substructure elements are structured on the basis of an Asynchronous Transfer Mode data format in accordance with an agreement known as second ATM adaptation layer AAL Type 2.

4. A method for connecting exchanges via a packet-oriented communication network as claimed in claim 1, wherein for data transmission, the substructure elements are arranged in a useful data area of a data packet such that a substructure element starts in a segment defined as first useful data segment of the data packet.

5. A method for connecting exchanges via a packet-oriented communication network as claimed in claim 1, the method further comprising the step of:

defining a pointer, in a segment defined as first useful data segment of an Internet Protocol data packet, which is used to denote a start address of a first substructure element situated in a useful data area of the Internet Protocol data packet.

* * * * *